United States Patent

Miki

[11] Patent Number: 5,833,905
[45] Date of Patent: Nov. 10, 1998

[54] PROCESS FOR PRODUCING POLYESTER COMPOSITION

[75] Inventor: Takatoshi Miki, Shiga-ken, Japan

[73] Assignee: Diafoil Hoechst Company, Limited, Tokyo, Japan

[21] Appl. No.: 920,007

[22] Filed: Aug. 29, 1997

[30] Foreign Application Priority Data

| Aug. 30, 1996 | [JP] | Japan | 8-248814 |
| Sep. 20, 1996 | [JP] | Japan | 8-271723 |
| Nov. 25, 1996 | [JP] | Japan | 8-329159 |
| Apr. 23, 1997 | [JP] | Japan | 9-120167 |

[51] Int. Cl.⁶ .................................................. B29C 47/38
[52] U.S. Cl. ............... 264/211.21; 525/437; 524/401; 524/777; 264/211.12; 264/239; 264/299
[58] Field of Search ............... 525/437; 524/777, 524/401; 264/211.12, 211.21, 239, 299

[56] References Cited

U.S. PATENT DOCUMENTS

| 4,699,744 | 10/1987 | Nakadate et al. | 264/101 |
| 4,877,819 | 10/1989 | Kiyohara et al. | 523/200 |
| 5,082,715 | 1/1992 | Lasch et al. | 428/143 |
| 5,474,844 | 12/1995 | Sato et al. | 428/332 |

*Primary Examiner*—Samuel A. Acquah
*Attorney, Agent, or Firm*—Foley & Lardner

[57] ABSTRACT

The present invention relates to a process for producing a polyester sheet comprising melt-extruding a polyester resin by using a vent-type twin-screw extruder in sheet-wise onto the surface of a rotating chilling drum under the condition satisfying the following formula (1):

$$5.2 \times 10^{-6} \times D^{2.8} \leq Q/N \leq 15.8 \times 10^{-6} \times D^{2.8} \qquad (1)$$

wherein D mm represents the inner diameter of the extruder cylinder, Q kg/hr represents the extrusion rate per unit time and N rpm represents the screw number of revolution.

15 Claims, 2 Drawing Sheets

PROCESS FOR PRODUCING POLYESTER COMPOSITION

BACKGROUND OF THE INVENTION

The present invention relates to a process for producing a polyester sheet. More particularly the present invention relates to a process for producing a polyester sheet by conducting a melt-extrusion under specific conditions using a vent-type twin-screw extruder, thereby minimizing the drop of intrinsic viscosity of the polyester after melt-extrusion.

Polyesters represented by polyethylene terephthalate and polyethylene naphthalate are popularly used as material of films, bottles, fibers and various other types of molded products because of their excellent chemical and physical properties. Especially, biaxially oriented polyester films represented by a polyethylene terephthalate film has been used as base of various commercial products in many fields, such as information recording media, capacitors, packaging materials, printing plates, electrical insulators, photographic films, etc., because of virtue of their many excellent properties such as mechanical properties, electrical properties, chemical resistance and dimensional stability.

It is commonly practiced to add fine particles or pigment to the polyester so as to satisfy workability or product quality requirements according to the purpose of use of the product. For example, in the case of packaging polyester film, adequate slipperiness of the film is an important factor for maintaining good workability when the film is rolled up. For providing such slipperiness to the film, a method is generally employed in which the inorganic and/or organic particles are contained in the film to form minute protuberances on the film surface.

For blending the said particles in a polyester, a method is known in which the particles are added and dispersed in the course of polymerization of the polyester. This method, however, has the problem that the coarse particles tend to form due to improper dispersion because it is difficult to provide high shearing in the reactor. Also, according to this method, it is hardly possible to perfectly remove the polyester composition remaining in the reactor when the kind of the particles used is changed, so that there is a problem of contamination of the product with the residual material.

As a solution to the above problem, Japanese Patent Application Laid-Open (KOKAI) No. 6-91635 proposes a process for producing a polyester composition using a vent-type molding machine (twin-screw extruder) in which a slurry of inorganic and/or organic particles is added to the polyester moving in the molding machine, and immediately after addition of the said slurry, the polyester is retained in the molding machine and substantially melted while the medium of the slurry is gasified and discharged out through a vent hole provided upstream of the slurry-added position.

Figure 2:
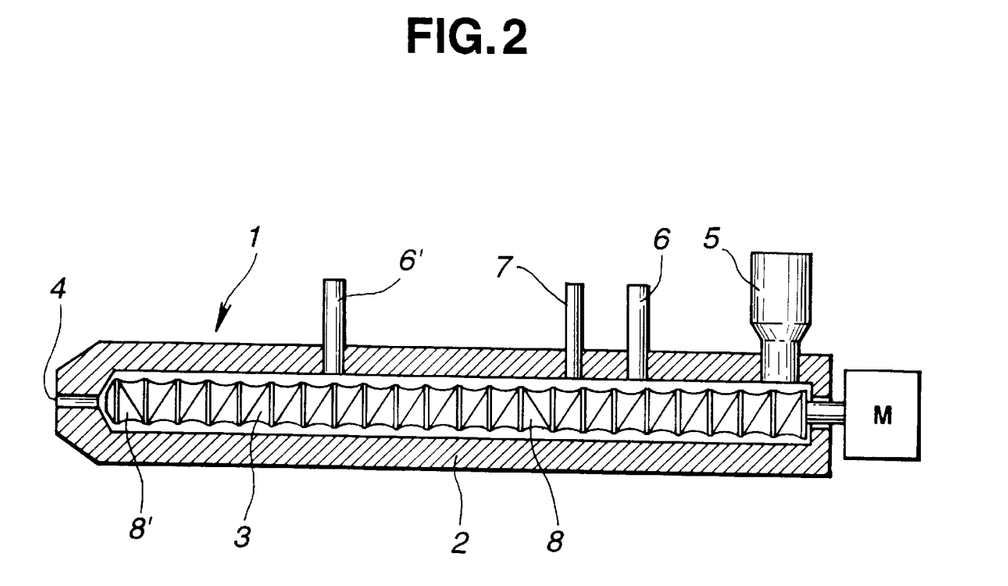
FIG. 2 is a side elevational illustration of the vent-type twin-screw extruder used in a conventional process.

Mixing of a solid and a liquid (including slurry) by using of a vent-type twin-screw extruder is a known technique in the art, and usually the vent-type twin-screw extruder used for this purpose is provided with a liquid-introducing nozzle at a position in front and/or in the rear of the vent hole. FIG. 2 of the accompanying drawings is a side elevational illustration of a vent-type twin-screw extruder used in the polyester-producing process described in the above KOKAI No. 6-91635. In the drawing, reference numeral denote as follows:

1: molding machine (twin-screw extruder), 2: heating cylinder, 3: screw, 4: extruding port, M: screw drive, 5: polymer feed opening, 6 and 6': vent holes, 7: slurry inlet, 8 and 8': reversing screw.

The process described in the above KOKAI No. 6-91635 is an improvement of the method using a vent-type twin-screw extruder provided with a liquid introducing nozzle, according to which the polyester and slurry mixing time is shortened by adding the slurry to the polyester moving in the vent-type twin-screw extruder, that is, by substantially completing melting of the polyester by the time when the slurry is added, thereby to inhibit or minimize the drop of viscosity of the polyester when melted.

In the above process, the reversing screw 8 is provided as retaining means in close adjacency to the slurry inlet 7. The slurry medium, after gasified, is discharged out through the vent hole 6 provided upstream of the position where the slurry is added. It is preferable that the vent hole 6 is provided as much close to the reversing screw 8 as possible within limits safe from causing the polyester to vent up or leak out (the phenomena that melted material is coming back up from bent hole). It is also preferable that more than 90% of the slurry medium be discharged out from the vent hole 6. Since the slurry is supplied from the slurry inlet 7 provided between the vent hole 6 and the reversing screw 8, that is, in the region where the internal pressure is elevated by gasification of the slurry medium, it is preferred to pressurize the slurry so that it may be added to and mixed with the polyester by getting the better of the vapor pressure in the heating cylinder 2. However, the above process has the following drawbacks.

(i) Agglomeration or breakup of the particles dispersed in the slurry occurs due to strong shearing force generated in the slurry pressurizing pump. As a result, dispersibility of the particles in the polyester is deteriorated and it is unable to obtain the dispersed particles with a desired diameter so that it is difficult to produce a high-quality polyester composition.

(ii) Since the constant feeding of a small quantity of slurry is difficult under the high-pressure conditions, the particle concentration in the polyester composition tends to vary. This problem is magnified by rapid gasification of the slurry medium caused in the manner described below. That is, since the temperature of the slurry supplied under high pressure is necessarily made higher than the boiling point of the medium and further the major part of the medium is removed from the vent hole 6 provided at a location adjacent to the slurry inlet 7, the slurry medium is rapidly gasified in the heating cylinder 2.

(iii) Since the slurry is added to the polyester which is in a substantially molten state, the operations in the steps till plasticization of the polyester can not be utilized for contacting with the slurry, so that the mixing efficiency is low.

(iv) It is preferred to minimize the drop of viscosity of the molten polyester by shortening the polyester and slurry mixing time by substantially melting the polyester by the time the slurry is added. However, since the polyester plasticization zone (reversing screw 8) and the vent hole 6 for removing the slurry medium are adjacent to each other, it is difficult to accomplish perfect removal of the medium under the condition of reduced pressure at the vent hole 6. The residual medium is discharged out from the vent hole 6'. Therefore, in case where water is used as the slurry medium, the polyester may be hydrolyzed and lowered in its intrinsic viscosity.

Further, the following problems arise in connection to intrinsic viscosity of the polyester after melt-extrusion.

Generally the higher the screw rotation speed for a given extrusion amount, the better the deaeration efficiency of the vent-type twin-screw extruder. In other words, an increase of screw speed for a given extrusion amount makes it possible to forcibly renew the surface of the polyester existing on the screw surface to provide a corresponding enhancement of deaerating efficiency from the molten polyester, resulting in an improvement of retention property of intrinsic viscosity of the polyester. However, as a result of the present inventors' study on relation between screw speed and deaerating efficiency, it was found that when the screw speed is increased while maintaining the extrusion amount kept constant, although the intrinsic viscosity retention property is improved steadily until the screw speed reaches a certain level, but thereafter there takes place a deterioration of the intrinsic viscosity retention property. Such a phenomenon is conspicuous in case of using a large-sized vent-type twin-screw extruder in which the inner diameter D of the cylinder is not less than 150 mm.

Moreover, the following problems may arise when the extruded polyester film is molded.

A polyester film can be produced by extruding the molten polyester onto a rotating chilling drum, closely adhering the polyester to the surface of the said drum to form a polyester sheet, and stretching the polyester sheet. Thus in the manufacture of polyester films, it is possible to produce polyester sheets with no surface defect at high efficiency.

In the production of polyester sheets, there has been employed an electrostatic pinning method for enhancing adhesion of the molten polyester to the rotating chilling drum surface. "Electrostatic pinning method" referred to herein means a method in which the linear electrodes are provided stretching in the direction orthogonal to the movement of the sheet on the upperside of the sheet extruded onto the rotating chilling drum, and a DC voltage of about 5 to 10 kV is applied to said electrodes to give static charges to the sheet, thereby enhancing adhesion between the sheet and the rotating chilling drum (Japanese Patent Publication (KOKOKU) No. 37-6124).

In this electrostatic pinning method, however, when the rotation speed of the rotating chilling drum is increased for the purpose of enhancing productivity, adhesive force between the sheet and the chilling drum surface decreases, resulting in producing so-called pinner bubbles (restrained air bubbles) which are causative of crater-like defects on the product sheet.

It is known that the said pinner bubbles tend to be formed when the specific resistance of the molten state polyester becomes higher. In order to lower specific resistance of the starting polyester when melted, various methods comprising adding a metal compound in the polyester have been proposed. For instance, a method comprising adding a metal compound to the polyester after completion of polymerization is proposed in Japanese Patent Application Laid-Open (KOKAI) No. 57-18534.

In the method of the above KOKAI No. 57-18534, 0.01 to 1 wt % of a metal salt of an aliphatic monocarboxylic acid or dicarboxylic acid is added to the polyester. Further in this method, from the viewpoint of homogeneous blend of the metal salt and the operatability thereof, there is preferably employed a process in which a so-called masterbatch containing the said metal salt in a high concentration is produced, and its chips are blended with the polyester. The masterbatch method, however, has the possibility of inviting the problems such as the decrease of molecular weight of the polyester because of use of a high-concentration metal salt.

As a solution to the above-mentioned problem, Japanese Patent Publication (KOKOKU) No. 4-64328 proposes a method by adding a metal salt so that the melting temperature of the polyester composition is restricted. The method of the KOKAI No. 4-64328, however, has disadvantages in which the method can only be applied to the polyesters having low melting points, and is inapplicable to other types of polyesters.

As a result of the present inventors' earnest studies to solve the above problems, it has been found that by conducting melt-extrusion of the polyester composition by using a vent-type twin-screw extruder under the specific conditions concerning the inner diameter of the extruder cylinder, extrusion rate per unit time and screw speed of the extruder, it is possible to produce a polyester composition in which the drop of intrinsic viscosity of the polyester is minimized when melted, and which polyester composition is capable of providing high-quality molded products. The present invention has been attained on the basis of the above finding.

SUMMARY OF THE INVENTION

An object of the present invention is to provide a process for producing a polyester sheet by using a vent-type twin-screw extruder, which process is improved in enhancement of deaerating efficiency in the extruder to minimize the drop of intrinsic viscosity of the polyester due to hydrolysis.

Another object of the present invention is to provide a process for producing a polyester composition containing the inorganic and/or organic particles by using a vent-type twin-screw extruder, in which the particles can be added to the polyester at high quantitative constancy, the drop of intrinsic viscosity of the polyester is minimized, and the composition has excellent particle dispersibility and moldability and is also capable of providing high-quality molded products.

Still another object of the present invention is to provide an industrially advantageous polyester sheet producing process comprising closely attaching a molten polyester sheet extruded from an extruder onto a rotating chilling drum to the surface of the said rotating chilling drum by using a electrostatic pinning technique, in which a metal salt is added to the polyester after completion of polymerization to enhance adhesion of the polyester sheet to the rotating chilling drum surface while inhibiting the drop of intrinsic viscosity of the polyester sheet.

To accomplish the above aims, in a first aspect of the present invention, there is provided a process for producing a polyester sheet comprising melt-extruding a polyester resin by using a vent-type twin-screw extruder in sheet-wise onto the surface of a rotating chilling drum under the condition satisfying the following formula (1):

$$5.2 \times 10^{-6} \times D^{2.8} \leq Q/N \leq 15.8 \times 10^{-6} \times D^{2.8} \tag{1}$$

wherein D mm represents the inner diameter of the extruder cylinder, Q kg/hr represents the extrusion rate per unit time and N rpm represents the screw number of revolution.

In a second aspect of the present invention, there is provided a process for producing a polyester sheet as defined in the first aspect, wherein melt extrusion is conducted by supplying a polyester and a slurry of inorganic and/or organic particles to a same material feed opening of the extruder.

In a third aspect of the present invention, there is provided a process for producing a polyester sheet as defined in the first aspect, wherein said polyester resin has not lower than $1 \times 10^{-7}$ Ωcm of a specific resistance when melted, a metal salt of an aliphatic monocarboxylic acid or dicarboxylic acid in amount of 0.5 to 1,000 ppm, calculated as metallic atom, based on the polyester resin, is simultaneously supplied with said polyester to the extruder, and the molten polyester sheet extruded onto a rotating chilling drum from the extruder is closely adhered to the surface of said chilling drum by use of an electrostatic pinning technique.

In a fourth aspect of the present invention, there is provided a process for producing a polyester sheet as defined in the first aspect, wherein melt extrusion is conducted by supplying a polyester and a slurry of inorganic and/or organic particles to a same material feed opening of the extruder, the said polyester resin has not lower than $1\times10^{-7}$ $\Omega$cm of a specific resistance when melted, a metal salt of an aliphatic monocarboxylic acid or dicarboxylic acid in amount of 0.5 to 1,000 ppm, calculated as metallic atom, based on the polyester resin, is simultaneously supplied with said polyester to the extruder, and the molten polyester sheet extruded onto a rotating chilling drum from the extruder is closely adhered to the surface of said chilling drum by use of an electrostatic pinning technique.

In a fifth aspect of the present invention, there is provided a process for producing a polyester sheet comprising using a vent-type twin-screw extruder, using a polyester resin having not lower than $1\times10^{-7}$ $\Omega$cm of a specific resistance when melted as starting material, supplying said polyester and a metal salt of an aliphatic monocarboxylic acid or dicarboxylic acid in amount of 0.5 to 1,000 ppm, calculated as metallic atom, based on the polyester resin, and closely adhering the molten polyester sheet extruded onto a rotating chilling drum from the extruder to the surface of said chilling drum by use of an electrostatic pinning technique.

In a sixth aspect of the present invention, there is provided a process for producing a polyester sheet as defined in the fifth aspect, wherein melt extrusion is conducted by supplying a polyester and a slurry of inorganic and/or organic particles to a same material feed opening of the extruder.

In a seventh aspect of the present invention, there is provided a process for producing a polyester sheet by using a vent-type twin-screw extruder, comprising conducting a melt-extrusion by supplying a polyester and a slurry of inorganic and/or organic particles to a same material feed opening of said extruder.

DETAILED DESCRIPTION OF THE INVENTION

The present invention is described in detail with reference to the accompanying drawings.

Figure 1:
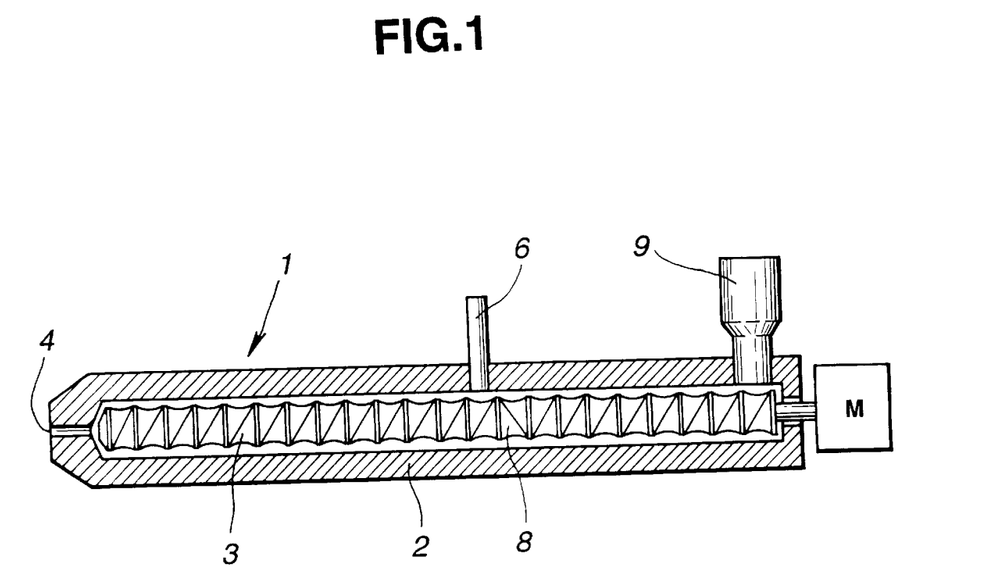
FIG. 1 is a side elevational illustration of an example of vent-type twin-screw extruder used in the process of the present invention.

FIG. 1 is a side elevational illustration of an example of vent-type twin-screw extruder used in the process of the present invention. In FIG. 1, reference numerals denote as follows:

1: molder (extruder); 2: heating cylinder; 3: screw; 4: extruding port; M: screw drive; 6: vent hole; 8: reversing screw; 9: polymer and slurry feed opening.

The polyester used in the present invention comprises an aromatic dicarboxylic acid component and a glycol component. Especially a polyester in which 80% or more of the repeating units are ethylene terephthalate units, ethylene-2, 6-naphthalate units or 1,4-cycloxylenedimethylene terephthalate units is preferred. Further, a third component may be copolymerized in the polyester.

As the said aromatic dicarboxylic acid component, there can be used, in addition to terephthalic acid and 2,6-naphthalenedicarboxylic acid, isophthalic acid, phthalic acid, adipic acid, sebacic acid, 4,4'-diphenyldicarboxylic acid, oxycarboxylic acid (such as p-oxyethoxybenzoic acid) and the like. As the said glycol component, there can be used, in addition to ethylene glycol and 1,4-cyclohexanedimethanol, diethylene glycol, triethylene glycol, propylene glycol, butanediol, neopentyl glycol and the like. In the present invention, a polyester in which 80% or more of the repeating units are ethylene terephthalate units or ethylene-2,6-naphthalate units is preferably used.

In the present invention, for producing a polyester having adequate slip properties, a slurry of inorganic and/or organic particles may be mixed in the polyester. The inorganic particles usable in the present invention include silica oxide, calcium carbonate, titanium oxide, aluminum oxide, barium sulfate, lithium fluoride, kaolin, and inorganic pigments such as iron oxide. The organic particles include divinylbenzene polymer, styrene-divinylbenzene copolymer, various types of ion exchange resin, and organic pigments such as anthraquinone. Any kind of particles can be used as far as they can be supplied in the form of a liquid slurry.

As the medium of the slurry in the present invention, there can be used any kind as far as it is a liquid which is gasified when the polyester is melted, or gasified by the reduced pressure in the vent portion, and does not cause the drop of intrinsic viscosity of the polyester. Water or ethylene glycol is preferably used as the said medium. For dispersing the inorganic and organic particles in the medium, a known method utilizing supersonics or shearing stress can be employed.

In the present invention, when a polyester sheet is produced by making use of electrostatic pinning techniques, it is preferable to add a metal salt of an aliphatic monocarboxylic acid or dicarboxylic acid to the polyester for enhancing adhesion between the sheet and the rotating chilling drum.

In the present invention, the metal salt may not be added into the polyester at the polymerization thereof so as to reduce the specific resistance thereof. The specific resistance of the polyester used in the present invention when melted is usually not less than $1\times10^{-7}$ $\Omega$cm, preferably not less than $3\times10^{-7}$ $\Omega$cm, more preferably not less than $5\times10^{-7}$ $\Omega$cm. When the specific resistance of the polyester is too high, the electrostatic pinning property is deteriorated. However, it is possible that the specific resistance of the polyester lowers while preventing the drop of intrinsic viscosity of the polyester by adding the metal salt. Therefore, the addition of metal salt acts more effectively when the specific resistance of the polyester when melted is more higher.

The metal salts of an aliphatic monocarboxylic acid or dicarboxylic acid usable in the present invention include lithium salt, sodium salt, potassium salt, manganese salt, zinc salt, calcium salt and aluminum salt of an aliphatic monocarboxylic acid or dicarboxylic acid having about 4 to 30 carbon atoms in the molecule. Of these metal salts, magnesium salt, manganese salt, zinc salt and calcium salt are preferred. Magnesium salt is especially preferred because it shows excellent heat stability during polyester melting and contributes to reduced formation of fisheyes.

More specific examples of the said metal salt of dicarboxilic acid are magnesium decane dicarboxylate which shows high heat resistance because of its high melting point, for example, 275° C., and contributes to maintaining the polyester polymerization degree at a high level.

More specific examples of the said metal salt of monocarboxilic acid are magnesium palmitate, manganese palmitate, zinc palmitate, magnesium stearate, zinc stearate, potassium oleate, sodium oleate, magnesium oleate, zinc oleate, magnesium sebacate, manganese sebacate, and the like. Of these, magnesium salts are preferred. Further, since magnesium stearate is cheap and safe compound, it is especially preferred and can be used to widely art such as packages for foods, packages for cosmetics and packages for drug.

The amount of the said metal salt supplied is preferably 0.5 to 1,000 ppm, more preferably 10 to 800 ppm, still more preferably 15 to 500 ppm, based on metal atom concentration in the polyester. When the metal atom concentration in the polyester is less than 0.5 ppm, the specific resistance of the polyester when melted may not lower sufficiently, causing a risk of forming a large amount of pinner bubbles in the sheet obtained by using a electrostatic pinning technique. When the metal atom concentration in the polyester is more than 1,000 ppm, the polyester may be decomposed by the excess metal salt, causing a drop of intrinsic viscosity of the polyester.

Thus, in the present invention, the polyester surface is successively renewed by the kneading action and the deaeration action in the extruder to avoid uneven distribution of the metal salt thereby inhibiting decomposition of the polyester. However in case where the metal atom concentration in the polyester is more than 1,000 ppm, the polyester decomposition-inhibiting effect by the kneading action and deaeration action may not be sufficient.

The intrinsic viscosity of the polyester supplied to the vent-type twin-screw extruder is optionally selected, but it is preferably 0.40 to 1.10, more preferably 0.50 to 1.00. When the intrinsic viscosity of the polyester is less than 0.40, the molded product may lack dynamic strength. When the intrinsic viscosity is more than 1.10, the intrinsic viscosity drop may increase. The intrinsic viscosity drop of the polyester extruded from the vent-type twin-screw extruder is usually not more than 10%, preferably not more than 9%, more preferably not more than 8%.

In the present invention, the melt extrusion is preferably conducted under the condition which satisfies the following formula (1), preferably the formula (2), more preferably the formula (3):

$$5.2 \times 10^{-6} \times D^{2.8} \leq Q/N \leq 15.8 \times 10^{-6} \times D^{2.8} \quad (1)$$

$$6.0 \times 10^{-6} \times D^{2.8} \leq Q/N \leq 15.0 \times 10^{-6} \times D^{2.8} \quad (2)$$

$$6.3 \times 10^{-6} \times D^{2.8} \leq Q/N \leq 14.7 \times 10^{-6} \times D^{2.8} \quad (3)$$

wherein D (mm) represents the inner diameter of the extruder cylinder, Q (kg/hr) represents extrusion rate per unit time and N (rpm) represents screw speed.

By satisfying the above condition, it is possible to enhance the deaerating efficiency while inhibiting excessive heat-generation by the shearing action of the screw and to prevent the drop of intrinsic viscosity of the polyester.

Under the condition of the formula (4) shown below, the screw speed is too high relative to the extrusion amount, which may tend to cause excessive heat-generation by shearing of the screw to deteriorate the intrinsic viscosity retention percentage. Under the condition of the formula (5) shown below, because of too low screw speed relative to the extrusion amount, the molten resin surface renewal degree under reduced pressure lowers to make it unable to effect sufficient deaeration, resulting in a deteriorated intrinsic viscosity retention percentage.

$$5.2 \times 10^{-6} \times D^{2.8} > Q/N \quad (4)$$

$$Q/N > 15.8 \times 10^{-6} \times D^{2.8} \quad (5)$$

In the present invention, it is possible to use two or more types of polyester which have different bulk densities as starting material. Specifically, regenerated polyester can be used as a part of the starting material. In such regenerated polyesters, so-called fluffs produced by crashing the film ends, whose bulk density is in the range of 0.01 to 0.60, have the problem that the fluffs may not be properly drawn up by the screw and may stay stagnant at the feed opening. Further, in the case of a material having a low bulk density such as fluffs, there takes place a large variation of pressure at the extruder end due to different transporting efficiency from the pellets at the transporting section of the screw, resulting in an enlarged variation of the extrusion amount. Thus, the fluffs having a low bulk density such as mentioned above have difficulties in use on a chip production line exclusively designed for fluffs.

According to the present invention, however, in the case where the bulk density of one of different polyesters is in the range of 0.01 to 0.60, it is possible to conduct melt-extrusion without problem even when using two or more different polyesters which have different bulk densities. According to the present invention, the pressure variation at the extruder end is limited within ±5 kg/cm² and further the polymer surface area at the vent portion increases, so that the deaeration efficiency is improved, particularly, the intrinsic viscosity retention percentage is improved, with the intrinsic viscosity drop after melt extrusion being reduced to not more than 10%.

The above-described conditions of the present invention is particularly effective in case where intrinsic viscosity of the polyester with the smallest bulk density is lower than intrinsic viscosity of the other polyester. The bulk density of the other polyester is preferably not more than 0.6. If this bulk density is more than 0.6, the intrinsic viscosity retention percentage improving effect may be reduced. On the other hand, if the bulk density is less than 0.01, since the volume of this polyester increases, it may become difficult to secure a sufficient feed of material, and there tend to arise the problems such as blocking of the feed pipes with material. The content of the polyester having a bulk density of 0.01 to 0.60 is usually not more than 60%, preferably not more than 55%, more preferably not more than 50% based on the total amount of the polyesters.

In the present invention, in case where a slurry of the inorganic and/or organic particles is mixed with the polyester, it is preferable to add the slurry from the polymer feed-opening 9 without providing a specific nozzle for slurry addition. The supplied polyester and slurry are transferred in the heating cylinder 2 towards the extruding port 4 by screw 3, and in the course of the transfer thereof, the medium of the slurry is gasified on receiving both the heat from the heating cylinder 2 and the heat generated by the shearing action. Consequently, the pressure in the heating cylinder 2 increases, and the slurry medium is gasified and discharged out from the polymer feed opening 9 until the time when the polyester reaches the reversing screw 8 portion and is brought into a half-molten state. In case where the diffusion of the gasified medium to the ambient environment may cause a pollution problem, it is preferred to provide a gasified medium suction extractor.

The polyester is transferred from the reversing screw 8 portion to the vent hole 6 and deaerated by the reduced pressure of the vent hole 6. The term "deaeration" used in the present specification means that moisture is diffused away from the molten polyester surface in case where a substantially undried polyester is used. Consequently, the drop of viscosity by dehydration of the polyester is minimized. The polyester, after deaerated at the vent hole 6, is forced out from the extruding port 4. If necessary, another vent hole may be provided between the extruding port 4 and the vent hole 6. Also, as is practiced with the ordinary extruders, the temperature of the extruded polyester composition may be maintained in a proper range by adjusting the temperature of the heating cylinder 2.

By supplying the polyester and the slurry from the polymer/slurry feed opening 9, it is possible to conduct slurry feed under normal or reduced pressure and to prolong the polyester/slurry contact time till the time when the polyester is plasticized. Therefore, the polymer/slurry feed opening 9 is not subject to any design restrictions, provided that it has a size not more than the length of 1D (D being the inner diameter of the extruder) in the axial direction.

The temperature of the slurry feed portion of the heating cylinder 2 is usually not more than 200° C., preferably not more than the boiling point of the slurry medium, more preferably not less than 10° C. lower than the boiling point of the medium. However, it is preferable to set the lower limit of the temperature of the slurry feed portion of the heating cylinder 2 at usually around 60° C. for conducting effective gasification of the medium from the slurry supply starting point.

In the present invention, since gasification of the slurry medium is started at the point when it was supplied to the material feed opening, it is possible to substantially perfectly remove the medium until the time when the polyester is plasticized, that is, when the polyester reaches the reversing screw 8. From the above reason, it is possible to use water which is suited as the slurry medium, and also water can be used in an amount of not more than 10 wt % based on the polyester. When it is more than 10 wt %, the amount of water vapor discharged from the polymer feed opening 9 may become too much, and it may be difficult to feed fresh supply of polyester and slurry.

In the present invention, the polyester is transferred to the vent hole 6 portion after the slurry medium has been removed in the manner described above. In case where a substantially undried polyester is used, moisture in the inside of this polyester is purged by the reduced pressure of the vent hole 6. For maximizing the deaerating efficiency, the degree of pressure reduction at the vent hole 6 is adjusted to be usually not more than 40 mmHg, preferably not more than 30 mmHg, more preferably not more than 10 mmHg.

In order to prevent the drop of the degree of polymerization of polyester by hydrolysis, it is preferable to conduct deaerating immediately at the portion where the melting of polyester starts in the twin-screw extruder. Accordingly, the vent hole 6 is provided at usually not more than 40D, preferably not more than 30D, more preferably not more than 25D from the feed opening 9.

In the present invention, in order to enhance adhesion of the polyester sheet to the casting drum when the polyester sheet is melt extruded onto the surface of the casting drum, there can be employed a electrostatic pinning method, an air knife method, a nip roll method or other suitable means.

According to the present invention, as described above, it is possible to use either substantially dried and substantially undried polyesters, and it is remarkable that, according to the present invention, the drop of intrinsic viscosity is minimized even when a substantially undried polyester is used.

In the present invention, as explained above, there is needed no specific nozzle for feed of slurry, it is sufficient to provide one material feed opening which is primarily a polymer supply port. Mixing a solid and a liquid (including slurry) by using a vent-type twin-screw extruder without providing a separate nozzle for adding the liquid is an essential of the present invention and quite an unexpected conception from the viewpoint of conventional knowledge. According to the present invention described above, there are provided various useful effects such as mentioned below along with the advantage that the cylinder strength is not lowered in use.

(i) Since the slurry is supplied into the cylinder 2 under atmospheric pressure, no slurry pressurizing pump is needed, and hence there arises no problem of agglomeration or breakup of the particles dispersed in the slurry which can be caused by the pump. It is also possible to keep free of the problem of nozzle blockage with the slurry which may occur in case where a nozzle is used. Further, the slurry temperature can be kept not more than 100° C.

(ii) Since the slurry temperature can be kept lower than the boiling point of the slurry medium, there takes place no rapid gasification of the medium. Consequently, since no rapid variation of pressure occurs, it is possible to add a small quantity of liquid slurry with very high quantitative constancy into the polyester.

(iii) A sufficient polyester/slurry contact time is secured, and the kneading and dispersing actions of the particles into the polyester is intensified, so that dispersibility of the particles in the polyester is improved.

(iv) Since gasification of the slurry medium is effected gently without causing a rapid rise of pressure in the polyester transporting portion, it is possible to easily remove the gasified medium from the polymer/slurry feed opening 9. Consequently, the medium is substantially perfectly removed until the time when the polyester is plasticized, so that it is possible to avoid drop of intrinsic viscosity of the polyester which was inevitable in the prior art where water is used as the medium. The problem of leaking out at the polymer/slurry feed opening 9 can be easily eliminated by properly operating the screw 3 at a high speed.

(v) Since the slurry medium is discharged out from the polymer/slurry feed opening 9, there is no need of sticking to use of a dry polyester. In case of using a substantially undried polyester, water contained in such polyester is removed by the pressure reducing at the vent hole 6. There is of course no problem in using a dry polyester. There is no possibility of deterioration of polyester properties evenwhen using a dry polyester whose water content is less than 50 ppm.

Hitherto, in order to solve the problems such as breakup of the polyester particles in the stretching step resulting from the drop of intrinsic viscosity caused by hydrolysis, it has been considered necessary to dry the polyester (before melted) to a water content of not more than 50 ppm in view of the general conception that it is necessary to limit the drop of intrinsic viscosity of less than 10%. However, such drying requires the conditions of, for example, 80° C. and 3 hours and further, the dried polyester is melt-extruded after chilling, so that the major part of the heating energy in the drying step is lost without being utilized for melt-extrusion. Therefore, the effect of the present invention enabling use of a substantially undried polyester is quite remarkable in its industrial significance not only in terms of production efficiency but also from the viewpoint of saving of energy.

Also, in case of using a substantially undried polyester, it can be directly subjected to melt-extrusion together with a fresh supply of undried polyester after having been properly crashed without drying, in the same way as the regenerated polyester such as slit films discharged from the film production processes.

In the vent-type twin-screw extruder used in the present invention, the directions of rotation of the respective screws may be the same or different. The ratio (L/D ratio) of the length (L) to the inner diameter (D) of the cylinder is usually 20 to 60, preferably 22 to 50. In case where the L/D ratio is more than 60, the retention time in the extruder may increase and there inevitably takes place a rise of temperature of the polyester in the extruder, which tends to cause a drop of degree of polymerization of the polyester. In case where the L/D ratio is less than 20, there is a tendency to cause insufficient melting of the polyester and unsatisfactory deaeration under the vent.

In the present invention, for securing close adhesion of the molten polyester sheet to the surface of the rotating chilling drum by the electrostatic pinning method, it is preferable to add a metal salt to the polyester after polymerization thereof. A metal salt is added along with the polyester from the material feed opening 9 of the extruder. Metal salt may be blended with the polyester and the mixture may be supplied from the said feed opening 9.

The polyester an d the metal salt supplied from the feed opening 9 are transferred in the heating cylinder 2 towards the extruding port 4 by the screw 3. There takes place diffusion deaeration (hereinafter simply referred to as deaeration) of moisture from the surface of the polyester transferred to the vent hole 6 portion from the reversing screw 8 portion, and as a result, thereby moisture is removed.

In the present invention, the polyester melted by the extruder is extruded sheet-wise from the extruding port 4 through the diehead onto a rotating chilling drum and closely attached to the drum surface by the electrostatic pinning method to form a substantially amorphous sheet (the diehead, the chilling drum and the appurtenant equipment are not shown in the drawing.). In order to improve thickness uniformity of the sheet in its longitudinal direction (the rotating direction of the chilling drum), a metering pump (so-called gear pump) may be disposed between the extruder and the diehead to uniformalize the flow rate of the molten polyester introduced into the diehead.

The electrodes used in the electrostatic pinning method may be either wires or braids. The DC voltage applied to the electrodes is usually in the range of about 5 to 10 kV. In the present invention, the electrostatic pinning method may be applied after forming a water film on the rotating chilling drum surface.

The chilling drum surface may be metallic or non-metallic, but it is preferably a conductor for maximizing the static adhesive force. The chilling drum surface temperature is usually 0° to 80° C., preferably 10° to 70° C., more preferably 15° to 60° C. When the drum surface temperature is less than 0° C., the adhesion between the sheet end and the chilling drum may lower to deteriorate flatness of the obtained sheet. On the other hand, when the drum surface temperature is more than 80° C., since the adhesion between the sheet and the drum may become too strong, it may be difficult to peel off the sheet. The surface speed of the rotating chilling drum is not specified, but it is preferably not lower than 30 m/min.

In the present invention, in order to enhance adhesion of the polyester sheet to the casting drum when the sheet is melt-extruded onto the drum surface, there may be properly employed other adhesion-enhancing methods such as air knife method and nip roll method, beside the above-described electrostatic pinning method.

According to the present invention, as explained above, there is provided a process for producing a polyester composition containing the inorganic and/or organic particles by using a vent-type twin-screw extruder, in which the said particles can be added with high quantitative constancy, the drop of intrinsic viscosity of the polyester is minimized, and the composition has excellent particle dispersibility and moldability and is capable of providing high-quality molded products. Thus, the present invention is of high industrial value.

EXAMPLES

The present invention is described in more detail by showing the examples thereof, which examples, however, are merely intended to be illustrative and not to be construed as limiting the scope of the invention.

In the following Examples and Comparative Examples, all percents (%) are by weight unless otherwise noted.

(1) Intrinsic viscosity [η] (dl/g) of polyester 100 ml of a 50/50 (by weight) mixed solvent of phenol and tetrachloroethane was added to 1 g of a polyester freed of other polymer components and particles incompatible with the polyester, and the intrinsic viscosity of the resulting solution was measured at 30° C.

(2) Particle dispersibility

Using a plasma reactor (Low Temperature Plasma Digester, Yamato Plasma Reactor PR31, mfd. by Alcatel Co., Ltd.), the polyester surface was ashed under the conditions of oxygen flow rate of 30 ml/min and output of 30 W, and the dispersed state of the particles was observed under a scanning electron microscope (SEM) and evaluated. The evaluation was expressed as follows:

×: the coarse agglomerates of particles existed.

⊚: no coarse agglomerates of particles existed and the particles were dispersed well.

○ when the rating was intermediate between × and ⊚.

In the present invention, the evaluation ⊚ or ○ is desirable.

(3) Addition suitability of slurry

The addition suitability of slurry was evaluated according to the following criterion:

⊚: A predetermined amount of the slurry could be added.

×: The slurry inlet was blocked or the slurry feed pressure exceeded 5 kg/cm$^2$ ○: The evaluation was intermediate between ⊚ and ×.

In the present invention, the evaluation ⊚ or ○ is required.

(4) Water content of polyester

Measured by a moisture meter (a micro-moisture meter CA-06, Mitsubishi Chemical Corporation).

(5) Bulk density of polyester

Determined as a weight W per unit volume V according to JIS K6722 using a bulk specific gravity meter.

(6) Intrinsic viscosity retention percentage of polyester

By a large drop of intrinsic viscosity, there are problems such as reduced practical strength of the film and break of the film during biaxial stretching to make it unable to conduct continuous operation. So, the intrinsic viscosity retention percentage was evaluated according to the following criterion:

⊚: The drop of intrinsic viscosity was less than 8%.

○: The drop of intrinsic viscosity was 8 to 10%.

×: The drop of intrinsic viscosity was more than 10%.

In the present invention, the evaluation ⊚ or ○ is desirable.

(7) General evaluation I of molded polyester film

The molded polyester films were evaluated according to the following criterion:

⊚: intrinsic viscosity retention percentage was less than 10% at the extrusion rate of less than 2 t/hr.

◉: intrinsic viscosity retention percentage was less than 10% at the extrusion rate of 2 t/hr or above.

×(practically unsuited): In other cases than the above.

Also, the polyester composition was judged as unsuited for practical use (marked X) in the following cases:

the case where it was incapable of melt-extrusion for some reason or other;

the case where there was required more than twice as much time from metering of the material till blending as needed when using a twin-screw extruder;

the case where although the polyester could be melt extruded into a sheet, there took place frequent break of the film during stretching; or the case where the extruder end pressure variation exceeded ±5 kg/cm².

In the present invention, the evaluation ⊚ or ○ is desirable.

(8) Melt specific resistance

First, 12 g of polyester was put into a branched test tube, then the test tube was immersed in a 285° C. oil bath, and after the polyester has been perfectly dissolved, pressure reduction and nitrogen gas replacement were repeated to perfectly eliminate the air bubbles. Then the stainless electrodes were inserted into the molten polyester and, after 10-minute retention, a DC voltage of 3 kV was applied thereto. The electric current immediately after voltage application was read, and the specific resistance was calculated from the following equation:

$$\rho v = (3,000/I) \times (S/L) \ (\Omega cm)$$

wherein ρv: specific resistance (Ωcm)
I: value of electric current (A)
S: sectional area (cm²) of each electrode
L: distance (cm) between the electrodes (9) General evaluation 2 of molded polyester film Polyester evaluation was also made according to the following criterion:

○: The intrinsic viscosity drop rate of the polyester sheet after melt-extrusion was less than 10%, and there arose no problem relating to pinner bubbles and the produced sheet quality was good under the condition of the rotating chilling drum speed of lower than 30 m/min.

⊚: There arose no problem relating to pinner bubbles and the produced sheet quality was good under the condition of the rotating chilling drum speed of 30 m/min or above.

×: The intrinsic viscosity drop rate was not less than 10%, and there existed pinner bubbles in the produced sheet or a stable electrostatic pinning could not be obtained.

In the present invention, the evaluation ⊚ or ○ is desirable.

Example 1

A substantially undried polyester (PET) having an intrinsic viscosity of 0.650 (dl/g), a water content of 0.2% and a bulk density of 0.7 was melt-extruded into the form of a sheet from a vent-type twin-screw extruder and chilled and solidified on the casting drum surface while applying the electrostatic pinning chilling techniques to obtain an unstretched sheet. This sheet was then stretched 3.5 times in the machine direction at 95° C. and 4.0 times in the transverse direction at 110° C., followed by a heat-treatment at 230° C. for 2 seconds to obtain a 15 μm thick biaxially stretched film.

In the above operation, a 65 mm-bore vent-type twin-screw extruder was used, and it was operated under the following conditions: discharge rate Q=300 kg/hr; screw speed N=300 rpm; degree of vacuum at the vent portion=2 hpa; resin temperature at the extruder end=295° C. The intrinsic viscosity of the thus obtained biaxially stretched film was 0.637 dl/g. The time required for the operations from feed of the polyester into the twin-screw extruder till obtainment of the unstretched sheet was 15 minutes. The results are shown collectively in Table 1.

Example 2

A polyester sheet was obtained by the same procedure as in Example 1 except that the screw speed and the discharge rate were changed to 400 rpm and 600 kg/hr, respectively, and that no biaxial stretching was conducted. The intrinsic viscosity of the obtained sheet was 0.627 dl/g. The results are shown collectively in Table 1.

Example 3

70% of a substantially undried polyester having an intrinsic viscosity of 0.650 dl/g, a water content of 0.2% and a bulk density of 0.7 and 30% of a substantially undried polyester having an intrinsic viscosity of 0.590 dl/g, a water content of 0.2% and a bulk density of 0.12 were supplied simultaneously to a vent-type twin-screw extruder and treated in the same way as in Example 1 to obtain a polyester sheet. The intrinsic viscosity of the obtained sheet was 0.625 dl/g. The results are shown collectively in Table 1.

Example 4

A substantially undried polyester A having an intrinsic viscosity of 0.650 dl/g, a water content of 0.2% and a bulk density of 0.7 and a substantially undried polyester B having an intrinsic viscosity of 0.610 dl/g, a water content of 0.2% and a bulk density of 0.7 were supplied into the separate vent-type twin-screw extruders and joined in the diehead to obtain a polyester A/B laminated sheet. The feed rate of the polyester A was adjusted to be 1,200 kg/hr and that of the polyester B was adjusted to be 300 kg/hr. The average intrinsic viscosity of the obtained laminated polyester sheet was 0.617 dl/g. The results are shown collectively in Table 1.

Examples 5–8

A substantially undried polyester having an intrinsic viscosity of 0.650 dl/g, a water content of 0.2% and a bulk density of 0.7 was melt-extruded by a vent-type twin-screw extruder under the conditions shown in Table 2, and general evaluation was made from the degree of drop of intrinsic viscosity of the polyester. The results are shown collectively in Table 2.

Comparative Example 1

A polyester sheet was obtained by the same procedure as in Example 1 except that the screw speed N and the discharge rate Q were changed to 400 rpm and 200 kg/hr, respectively. Then it was tried to stretch the sheet 3.5 times in the machine direction at 95° C. and 4.0 times transversely at 110° C., but frequent break of the sheet occurred during transverse stretching, making it unable to obtain a biaxially stretched film. The results are shown collectively in Table 3.

Comparative Example 2

Melt-extrusion of a polyester was conducted in the same way as in Example 3 except that the screw speed N was changed to 150 rpm, but the material feed opening was blocked and the polyester could not be extruded smoothly. The results are shown collectively in Table 3.

Comparative Example 3

A substantially undried polyester having an intrinsic viscosity of 0.650 dl/g, a water content of 0.2% and a bulk density of 0.7 was dried at 150° C. for 30 minutes, then further dried at 180° C. for 3 hours and melt-extruded into a sheet by using a single-screw extruder. The sheet was treated in the same way as in Example 1 to obtain a biaxially stretched film. The intrinsic viscosity of the obtained film was 0.620 dl/g. The time required from start of material blending till melt extrusion was as long as 5 hours, which indicates very poor production efficiency of this example in comparison with the above-shown Examples. The results are shown collectively in Table 3.

Comparative Examples 4 and 5

A substantially undried polyester having an intrinsic viscosity of 0.650 dl/g, a water content of 0.2% and a bulk density of 0.7 was melt-extruded by a vent-type twin-screw extruder under the conditions shown in Table 3, and the degree of drop of intrinsic viscosity was examined. The drop of intrinsic viscosity was large in each case, indicating that these Comparative Examples are practically unemployable for the production of polyester sheets.

TABLE 1

|  | Example 1 | Example 2 | Example 3 | Example 4 |
|---|---|---|---|---|
| <Starting resin> | | | | |
| Intrinsic viscosity (dl/g) | 0.650 | 0.650 | 0.650 | 0.650 |
| | — | — | 0.590 | 0.610 |
| Bulk density (g/cm$^3$) | 0.70 | 0.70 | 0.700 | 0.70 |
| | — | — | 0.12 | 0.70 |
| <Melt extruder> | | | | |
| Bore D1 (mm) | 65 | 65 | 65 | 120 |
| Bore D2 (mm) | — | — | — | 65 |
| Discharge rate Q1 (kg/h) | 300 | 600 | 300 | 1200 |
| Screw speed N1 (rpm) | 300 | 400 | 300 | 200 |
| Discharge rate Q2 (kg/h) | — | — | — | 300 |
| Screw speed N2 (rpm) | — | — | — | 300 |
| <Product> | | | | |
| Intrinsic viscosity (dl/g) | 0.637 | 0.627 | 0.625 | 0.617 |
| General evaluation | ○ | ○ | ⊚ | ○ |

TABLE 2

|  | Example 5 | Example 6 | Example 7 | Example 8 |
|---|---|---|---|---|
| <Starting resin> | | | | |
| Intrinsic viscosity (dl/g) | 0.650 | 0.650 | 0.650 | 0.650 |

TABLE 2-continued

|  | Example 5 | Example 6 | Example 7 | Example 8 |
|---|---|---|---|---|
| Bulk density (g/cm$^3$) | 0.70 | 0.70 | 0.70 | 0.70 |
| <Melt extruder> | | | | |
| Bore D1 (mm) | 140 | 140 | 160 | 180 |
| Discharge rate Q (kg/h) | 1700 | 1700 | 2300 | 3000 |
| Screw speed N (rpm) | 180 | 150 | 180 | 170 |
| <Product> | | | | |
| Intrinsic viscosity (dl/g) | 0.637 | 0.642 | 0.636 | 0.638 |
| General evaluation | ○ | ○ | ⊚ | ○ |

TABLE 3

|  | Comp. Ex. 1 | Comp. Ex. 2 | Comp. Ex. 3 | Comp. Ex. 4 | Comp. Ex. 5 |
|---|---|---|---|---|---|
| <Starting resin> | | | | | |
| Intrinsic viscosity (dl/g) | 0.650 | 0.650 | 0.650 | 0.650 | 0.650 |
| Bulk density (g/cm$^3$) | 0.70 | 0.70 | 0.70 | 0.70 | 0.70 |
| <Melt extruder> | | | | | |
| Bore D1 (mm) | 65 | 65 | 65 | 120 | 140 |
| Discharge rate Q (kg/h) | 200 | 300 | 300 | 1200 | 1700 |
| Screw speed N (rpm) | 400 | 150 | 300 | 400 | 300 |
| <Product> | | | | | |
| Intrinsic viscosity (dl/g) | — | — | 0.620 | 0.520 | — |
| Problems | — | Unable to extrude | Requires much time | — | — |
| General evaluation | X | X | X | X | X |

Example 9

A substantially undried polyethylene terephthalate having an intrinsic viscosity of 0.650 dl/g and a water content of 0.2%, and a water slurry containing 15% of fine silica (Silicia, SL 320, mfd. by Fuji Silicia Co., Ltd.) were supplied into a vent-type twin-screw extruder of the structure shown in FIG. 1 having a cylinder diameter of 44 mm from a same material feed opening, and the polyester composition was melt-extruded: screw speed=350 rpm; slurry addition rate=1.5 kg/hr; overall extrusion rate=50 kg/hr. The slurry addition could be performed stably with high quantitative constancy, the intrinsic viscosity of the obtained polyester composition was 0.627 dl/g, and the particle dispersibility in the composition was also excellent. The results are shown collectively in Table 4.

Example 10

A polyester composition was obtained in the same way as in Example 9 except for use of substantially undried polyethylene terephthalate having an intrinsic viscosity of 0.621. The slurry addition could be performed stably with high quantitative constancy, the intrinsic viscosity of the obtained polyester composition was 0.603 dl/g, and particle dispersibility in the composition was excellent. The results are shown collectively in Table 4.

Example 11

A substantially undried polyethylene terephthalate having an intrinsic viscosity of 0.647 dl/g and a water content of 0.2%, and a water slurry containing 20% of fine silica (Silicia, SL 320) were supplied into the vent-type twin-screw extruder of the structure shown in FIG. 1 having a cylinder diameter of 90 mm, and the polyester composition was melt extruded at a screw speed of 210 rpm and a slurry addition rate of 9 kg/hr. The overall extrusion rate was 400 kg/hr. The slurry addition could be performed stably with high quantitative constancy, the intrinsic viscosity of the obtained polyester composition was 0.613 dl/g, and the particle dispersibility in the composition was very good. The results are shown collectively in Table 4.

Example 12

A polyester composition was obtained in the same way as in Example 9 except for use of a slurry prepared by using a medium comprising 75% of water and 25% of methanol. Slurry addition could be performed stably with high quantitative constancy. The intrinsic viscosity of the obtained polyester composition was 0.610 dl/g, and the particle dispersibility in the composition was excellent. The results are shown collectively in Table 4.

Comparative Example 6

A polyester composition was obtained in the same way as in Example 9 except for use of the vent-type twin-screw extruder shown in FIG. 2. Approximately 30 minutes after start of the slurry feed, the slurry inlet in the heating cylinder was blocked, making it unable to feed the slurry. Investigation of the slurry inlet conducted by stopping the extruder showed that the aggregated silica particles stayed solidified at the inlet end.

Comparative Example 7

Polyethylene terephthalate was melt-extruded in the same way as in Comparative Example 6 except that the water slurry concentration was 7%, and that the slurry was added at a rate of 11 kg/hr. There took place no blockage of the water slurry feed opening because of high feed rate of the water slurry, but since the heating cylinder temperature was high and also the polyester in the heating cylinder was heated to a temperature not less than 100° C., the medium water boiled vehemently on addition of the water slurry, and it was difficult to feed the water slurry stably with quantitative constancy unless the water slurry feed pressure was made not less than 8 kg/cm$^2$. The results are shown collectively in Table 5.

Comparative Example 8

Polyethylene terephthalate was melt-extruded in the same way as in Comparative Example 6 except that the water slurry concentration was made 10%, and that the slurry was added at a rate of 2 kg/hr. About one hour after start of slurry feed, the slurry inlet in the heating cylinder was blocked, making it unable to feed the slurry. Investigation of the slurry inlet conducted by stopping the extruder showed that the aggregated silica particles stayed solidified at the inlet end. The results are shown collectively in Table 5.

TABLE 4

|  | Example 9 | Example 10 | Example 11 | Example 12 |
|---|---|---|---|---|
| Intrinsic viscosity (dl/g) | 0.650 | 0.621 | 0.647 | 0.650 |

TABLE 4-continued

|  | Example 9 | Example 10 | Example 11 | Example 12 |
|---|---|---|---|---|
| Slurry medium | Water | Water | Water | Water/methanol |
| Slurry concentration (wt %) | 15 | 15 | 20 | 15 |
| Slurry added position*) | A | A | A | A |
| Slurry adding rate (kg/hr) | 1.5 | 1.5 | 1..3 | 1.5 |
| Overall extrusion rate (kg/hr) | 50 | 50 | 400 | 50 |
| Intrinsic viscosity after extrusion (dl/g) | 0.627 | 0.603 | 0.613 | 0.610 |
| Particle dispersibility | ⊚ | ⊚ | ⊚ | ○ |
| Slurry addition suitability | ⊚ | ⊚ | ⊚ | ○ |
| General evaluation | ⊚ | ⊚ | ⊚ | ○ |

*Slurry added position A is the same as the polyester feed opening.

TABLE 5

|  | Comparative Example 6 | Comparative Example 7 | Comparative Example 8 |
|---|---|---|---|
| Intrinsic viscosity (dl/g) | 0.650 | 0.650 | 0.647 |
| Slurry medium | Water | Water | Water |
| Slurry concentration (wt %) | 15 | 7 | 10 |
| Slurry added position*) | B | B | B |
| Slurry adding rate (kg/hr) | 1.5 | 11.0 | 2.0 |
| Overall extrusion rate (kg/hr) | 50 | 50 | 50 |
| Intrinsic viscosity after extrusion (dl/g) | — | 0.541 | — |
| Particle dispersibility | — | X | — |
| Slurry addition suitability | X | X | X |
| General evaluation | X | X | X |

*Slurry added position B is different from the polyester feed opening.

Example 13

To a polyester having a specific resistance of 200×10$^7$ Ωcm and an intrinsic viscosity of 0.640, magnesium decanedicarboxylate was added so that the Mg atom concentration in the polyester became 60 ppm, and the mixture was melted in a vent-type twin-screw extruder having a cylinder diameter of 120 mm, then extruded into a sheet from the diehead through a gear pump and electrostatically attached to a 30° C. rotating chilling (metal-made) drum surface using 0.04 mm-diameter wire electrodes to obtain a 230 μm thick sheet. The treating conditions were as follows: screw speed of twin-screw extruder=167 rpm; extrusion rate=1,000 kg/h; voltage applied to the electrodes=5.0 kV; electric current which flew to the electrodes=1.2 mA; cooling roll surface speed=20 m/min. The obtained sheet showed a specific resistance of $5.7 \times 10^7$ Ωcm when melted and an intrinsic viscosity of 0.627, was free of defects such as pinner bubbles, and had high thickness uniformity.

Example 14

An amorphous sheet was produced by the same procedure as in Example 13 except that manganese sebacate was used as metal salt and it was added in such an amount that its concentration in the polyester became 400 ppm. The obtained sheet showed a specific resistance of $7.0 \times 10^7$ Ωcm when melted and an intrinsic viscosity of 0.620, and had good quality.

Example 15

An amorphous sheet was produced by the same procedure as in Example 13 except that magnesium decanedicarboxylate was added in such an amount that the Mg atom concentration in the polyester became 30 ppm. The electric current which flew to the electrodes on application of a voltage of 5.0 kV was 1.3 mA. The obtained sheet showed a specific resistance of $3.7 \times 10^7$ Ωcm when melted and an intrinsic viscosity of 0.623, and its quality was good as in Example 13.

Example 16

An amorphous sheet was produced by the same procedure as in Example 13 except that magnesium decanedicarboxylate was added in such an amount that the Mg atom concentration in the polyester became 120 ppm. The electric current which flew to the electrodes on application of a voltage of 7.0 kV was 2.6 mA. The obtained sheet showed a specific resistance of $2.4 \times 10^7$ Ωcm when melted and an intrinsic viscosity of 0.619, and had good quality as in Example 13.

Examples 17–19

Amorphous sheets were produced by the same procedure as in Example 13 except that the rotating chilling drum speed was adjusted to be 30 m/min, 70 m/min and 80 m/min, respectively. The specific resistance when melted and intrinsic viscosity of the obtained sheets are shown in Table 6. Also, these sheets had good quality as in Example 13 as shown in Table 7.

Comparative Example 9

An amorphous sheet was produced by the same procedure as in Example 13 except that no metal salt was added. The obtained sheet showed a specific resistance of $168 \times 10^7$ Ωcm when melted and an intrinsic viscosity of 0.629, had many crater-like flaws caused by pinner bubbles, and was commercially unacceptable in quality.

Comparative Example 10

It was tried to produce an amorphous sheet by the same procedure as in Example 13 except that no metal salt was added, and that the rotating chilling drum speed was changed to 70 m/min, but the sheet failed to adhere tightly to the rotating chilling drum due to insufficient static adhesive force and the molten polyester hanged on to the electrodes, so that it was impossible to obtain an amorphous sheet. The specific resistance of the polyester when melted was $168 \times 10^7$ Ωcm, and intrinsic viscosity was 0.629.

Comparative Example 11

An amorphous sheet was produced by the same procedure as in Example 13 except for use of a single-screw extruder with a cylinder diameter of 200 mm. The specific resistance of the obtained sheet when melted was $4.0 \times 10^7$ Ωcm, and its intrinsic viscosity was 0.495, too low for practical use.

Comparative Example 12

It was tried to produce an amorphous sheet by the same procedure as in Example 13 except that magnesium decanedicarboxylate was added in such an amount that the Mg atom concentration in the polyester would become 2,000 ppm, but it was impossible to obtain an amorphous sheet stably because of too low melt viscosity. The specific resistance of the molten polyester extruded from the diehead was $0.5 \times 10^7$ Ωcm, and its intrinsic viscosity was 0.400.

TABLE 6

|  | Specific resistance (Ω cm) Before extrusion: $200 \times 10^7$ After extrusion | Intrinsic viscosity (dl/g) Before extrusion: 0.640 After extrusion | Surface speed of rotating chilling drum (m/min) |
|---|---|---|---|
| Example 13 | 5.7 | 0.627 | 20 |
| Example 14 | 7.0 | 0.620 | 20 |
| Example 15 | 3.7 | 0.623 | 20 |
| Example 16 | 2.4 | 0.619 | 20 |
| Example 17 | 5.7 | 0.627 | 30 |
| Example 18 | 5.7 | 0.627 | 70 |
| Example 19 | 5.7 | 0.627 | 80 |
| Comparative Example 9 | 168 | 0.629 | 20 |
| Comparative Example 10 | 168 | 0.629 | 70 |
| Comparative Example 11 | 4.0 | 0.495 | 20 |
| Comparative Example 12 | 0.5 | 0.400 | 20 |

TABLE 7

|  | Metal salt | | General evaluation |
|---|---|---|---|
|  | Type | Content (ppm) |  |
| Example 13 | Magnesium decanedicarboxylate | 625 | ○ |
| Example 14 | Manganese sebacate | 400 | ○ |
| Example 15 | Magnesium decanedicarboxylate | 375 | ○ |
| Example 16 | Magnesium decanedicarboxylate | 1250 | ○ |
| Example 17 | Magnesium decanedicarboxylate | 625 | ◎ |
| Example 18 | Magnesium decanedicarboxylate | 625 | ◎ |
| Example 19 | Magnesium decanedicarboxylate | 625 | ◎ |
| Comparative Example 9 | None | — | X |
| Comparative Example 10 | None | — | X |
| Comparative Example 11 | Magnesium decanedicarboxylate | 375 | X |
| Comparative Example 12 | Magnesium decanedicarboxylate | 2 (wt %) | X |

Example 20

To a polyester having a specific resistance of $167 \times 10^7$ Ωcm and an intrinsic viscosity of 0.649, magnesium stearate was added so that the Mg atom concentration in the polyester became 45 ppm, and the mixture was melted in a vent-type twin-screw extruder having a cylinder diameter of 120 mm, then extruded into a sheet from the diehead through a gear pump and electrostatically attached to a 30° C. rotating chilling (metal-made) drum surface using 0.04 mm-diameter wire electrodes to obtain a 220 μm thick sheet. The treating conditions were as follows: screw speed of twin-screw extruder=167 rpm; extrusion rate=1,000 kg/h; voltage applied to the electrodes=5.0 kV; electric current which flew to the electrodes=1.2 mA; cooling roll surface speed=20 m/min. The obtained sheet showed a specific resistance of $1.7 \times 10^7$ Ωcm when melted and an intrinsic viscosity of 0.629, was free of defects such as pinner bubbles, and had high thickness uniformity. The results are shown collectively in Table 8.

Example 21

An amorphous sheet was produced by the same procedure as in Example 20 except that manganese stearate was added in such an amount that the Mg atom concentration in the polyester became 24 ppm. The obtained sheet showed a specific resistance of $2.8 \times 10^7$ Ωcm when melted and an intrinsic viscosity of 0.632, and had good quality. The results are shown collectively in Table 8.

Example 22

An amorphous sheet was produced by the same procedure as in Example 20 except that manganese stearate was added in such an amount that the Mg atom concentration in the polyester became 120 ppm. The electric current which flew to the electrodes on application of a voltage of 7.0 kV was 2.6 mA. The obtained sheet showed a specific resistance of $3.7 \times 10^7$ Ωcm when melted and an intrinsic viscosity of 0.619, and its quality was good as in Example 20. The results are shown collectively in Table 8.

Examples 23–25

Amorphous sheets were produced by the same procedure as in Example 20 except that the rotating chilling drum speed was adjusted to be 40 m/min, 70 m/min and 80 m/min, respectively. These obtained sheets had good quality as in Example 20. The results are shown collectively in Table 8.

Comparative Example 13

An amorphous sheet was produced by the same procedure as in Example 20 except that no magnesium stearate was added. The obtained sheet had many crater-like flaws caused by pinner bubbles, and was commercially unacceptable in quality. The results are shown collectively in Table 8.

Comparative Example 14

It was tried to produce an amorphous sheet by the same procedure as in Example 20 except that no magnesium stearate was added, and that the rotating chilling drum speed was changed to 80 m/min, but the sheet failed to adhere tightly to the rotating chilling drum due to insufficient static adhesive force and the molten polyester hanged on to the electrodes, so that it was impossible to obtain an amorphous sheet. The results are shown collectively in Table 8.

Comparative Example 15

An amorphous sheet was produced by the same procedure as in Example 20 except for use of a single-screw extruder with a cylinder diameter of 200 mm. The specific resistance of the obtained sheet when melted was $2.0 \times 10^7$ Ωcm, and its intrinsic viscosity was 0.495, too low for practical use. The results are shown collectively in Table 8.

Comparative Example 16

It was tried to produce an amorphous sheet by the same procedure as in Example 20 except that magnesium stearate was added in such an amount that the Mg atom concentration in the polyester would become 2,000 ppm, but it was impossible to obtain an amorphous sheet stably because of too low melt viscosity. The intrinsic viscosity of the obtained sheet was 0.400, too low and cannot be used as polyester sheet. The results are shown collectively in Table 8.

TABLE 8

| | Specific resistance after extrusion[1] (Ω cm) | Intrinsic viscosity after extrusion[2] (dl/g) | Surface speed of rotating chilling drum (m/min) | General evaluation |
|---|---|---|---|---|
| Ex. 20 | 1.7 | 0.629 | 20 | ○ |
| Ex. 21 | 2.8 | 0.632 | 20 | ○ |
| Ex. 22 | 3.7 | 0.619 | 20 | ○ |
| Ex. 23 | 2.4 | 0.629 | 40 | ⊙ |
| Ex. 24 | 5.7 | 0.629 | 70 | ⊙ |
| Ex. 25 | 5.7 | 0.629 | 80 | ⊙ |
| Comp. Ex. 13 | 100 | 0.629 | 20 | X |
| Comp. Ex. 14 | 100 | 0.629 | 70 | X |
| Comp. Ex. 15 | 2.0 | 0.495 | 20 | X |
| Comp. Ex. 16 | 1.9 | 0.400 | 20 | X |

[1]Specific resistance before extrusion: $167 \times 10^7$ Ω cm.
[2]Intrinsic viscosity before extrusion: 0.649 (dl/g)

What is claimed is:

1. A process for producing a polyester sheet comprising melt-extruding a polyester resin by using a vent-type twin-screw extruder in sheet-wise onto the surface of a rotating chilling drum under the condition satisfying the following formula (1):

$$5.2 \times 10^{-6} \times D^{2.8} \leq Q/N \leq 15.8 \times 10^{-6} \times D^{2.8} \qquad (1)$$

wherein D mm represents the inner diameter of the extruder cylinder, Q kg/hr represents the extrusion rate per unit time and N rpm represents the screw number of revolution.

2. The process according to claim 1, wherein the inner diameter of the extruder cylinder is not less than 150 mm.

3. The process according to claim 1 using a substantially undried polyester.

4. The process according to claim 1, wherein the drop of intrinsic viscosity of said polyester resin after melt extrusion is not more than 10% based on the intrinsic viscosity of the polyester before melt extrusion.

5. The process according to claim 1, which further comprises supplying said polyester resin and a slurry of inorganic and/or organic particles.

6. The process according to claim 5, wherein said polyester resin and said slurry are supplied to a same material feed opening of the extruder.

7. The process according to claim 5, wherein said slurry comprises the inorganic and/or organic particles and water used substantially as medium.

8. The process according to claim 1, wherein said polyester resin has not lower than $1 \times 10^{-7}$ Ωcm of a specific resistance when melted, a metal salt of an aliphatic mono-carboxylic acid or dicarboxylic acid in amount of 0.5 to 1,000 ppm, calculated as metallic atom, based on the polyester resin, is simultaneously supplied with said polyester to the extruder, and the molten polyester sheet extruded onto a rotating chilling drum from the extruder is closely adhered to the surface of said chilling drum by use of an electrostatic pinning technique.

9. The process according to claim 8, wherein said metal salt is magnesium decanedicarboxylate.

10. The process according to claim 8, wherein said metal salt is magnesium monocarboxylate.

11. The process according to claim 8, wherein the surface speed of said rotating chilling drum is not lower than 40 m/min.

12. A process for producing a polyester sheet comprising
using a vent-type twin-screw extruder,
using a polyester resin having not lower than $1\times10^{-7}$ $\Omega$cm of a specific resistance when melted as starting material,
supplying said polyester and a metal salt of an aliphatic monocarboxylic acid or dicarboxylic acid in amount of 0.5 to 1,000 ppm, calculated as metallic atom, based on the polyester resin, and
closely adhering the molten polyester sheet extruded onto a rotating chilling drum from the extruder to the surface of said chilling drum by use of an electrostatic pinning technique.

13. The process according to claim 12, which further comprises supplying said polyester resin, said metal salt and a slurry of inorganic and/or organic particles.

14. The process according to claim 13, wherein said polyester resin and said slurry are supplied to a same material feed opening of the extruder.

15. A process for producing a polyester sheet by using a vent-type twin-screw extruder, comprising conducting a melt-extrusion by supplying a polyester and a slurry of inorganic and/or organic particles to a same material feed opening of said extruder.

* * * * *